March 17, 1970  K. M. SANTELMANN  3,500,502
MOLD FOR THE PRODUCTION OF BOOTS OF RUBBER OR PLASTICS MATERIAL
Filed Oct. 4, 1967  4 Sheets-Sheet 1
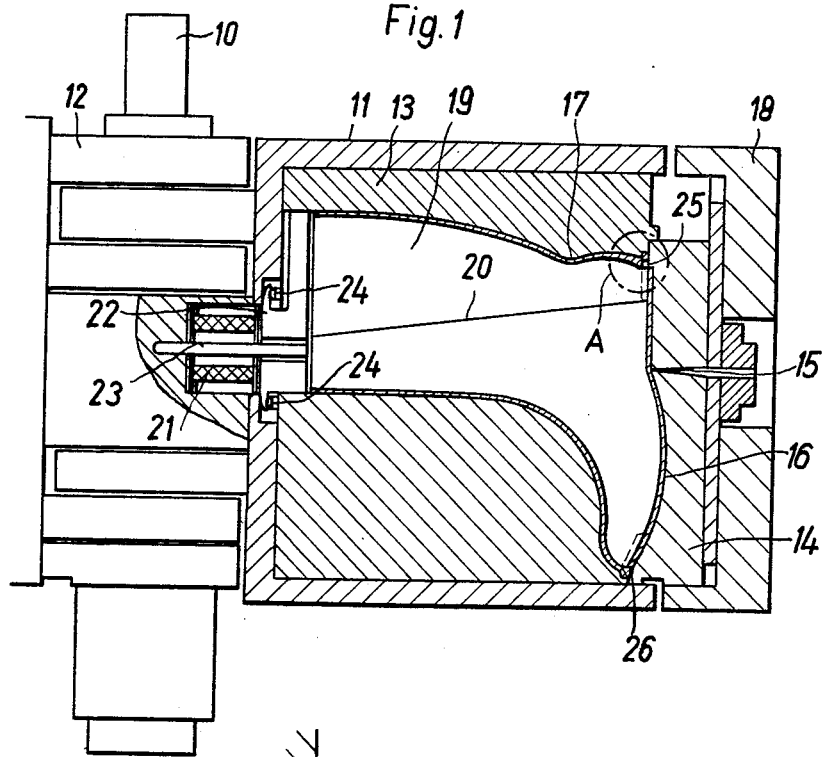
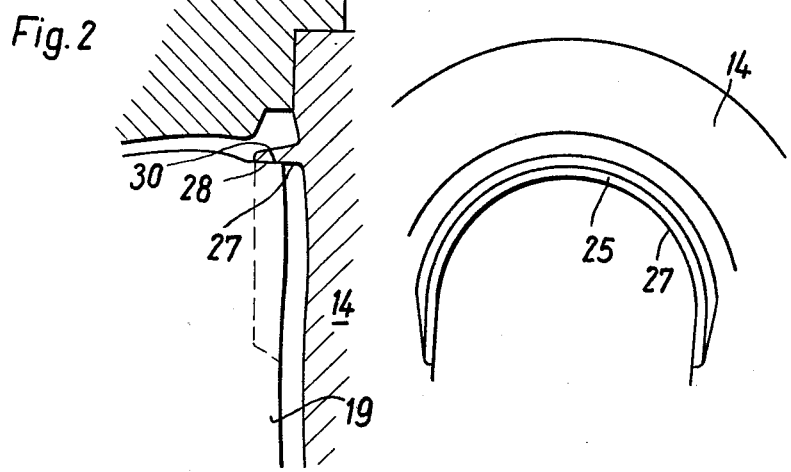
Inventor:
KURT M. SANTELMANN
By
Lowry & Rinehart
ATTYS.

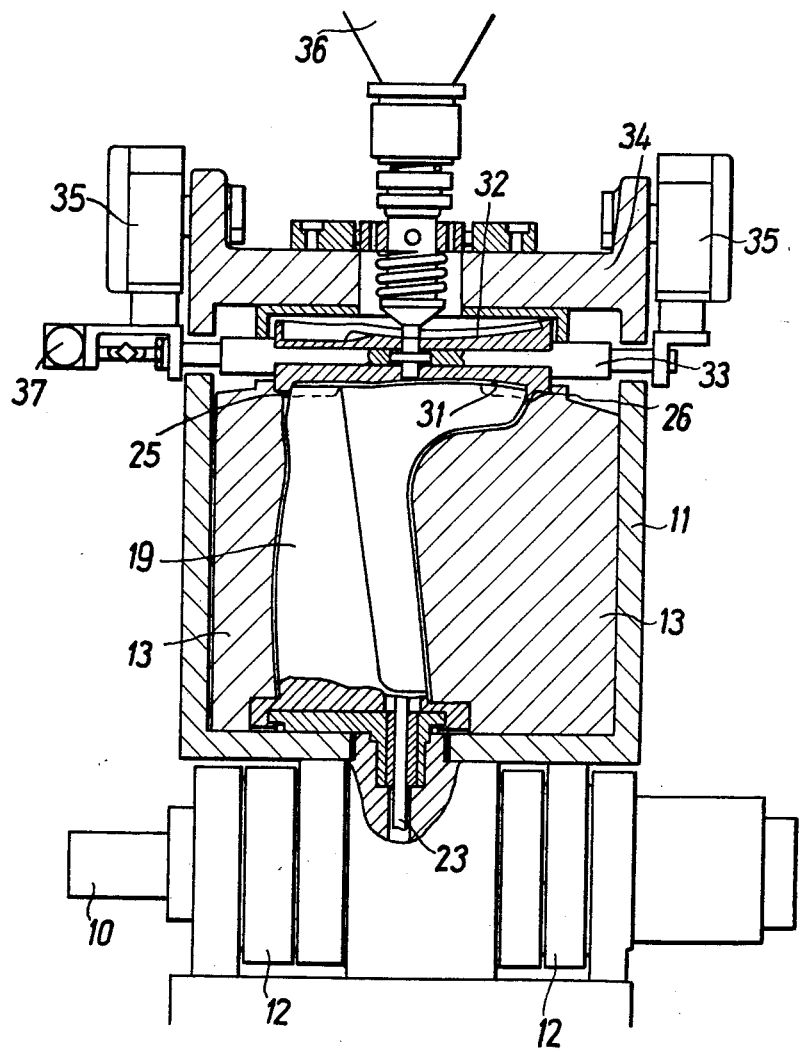

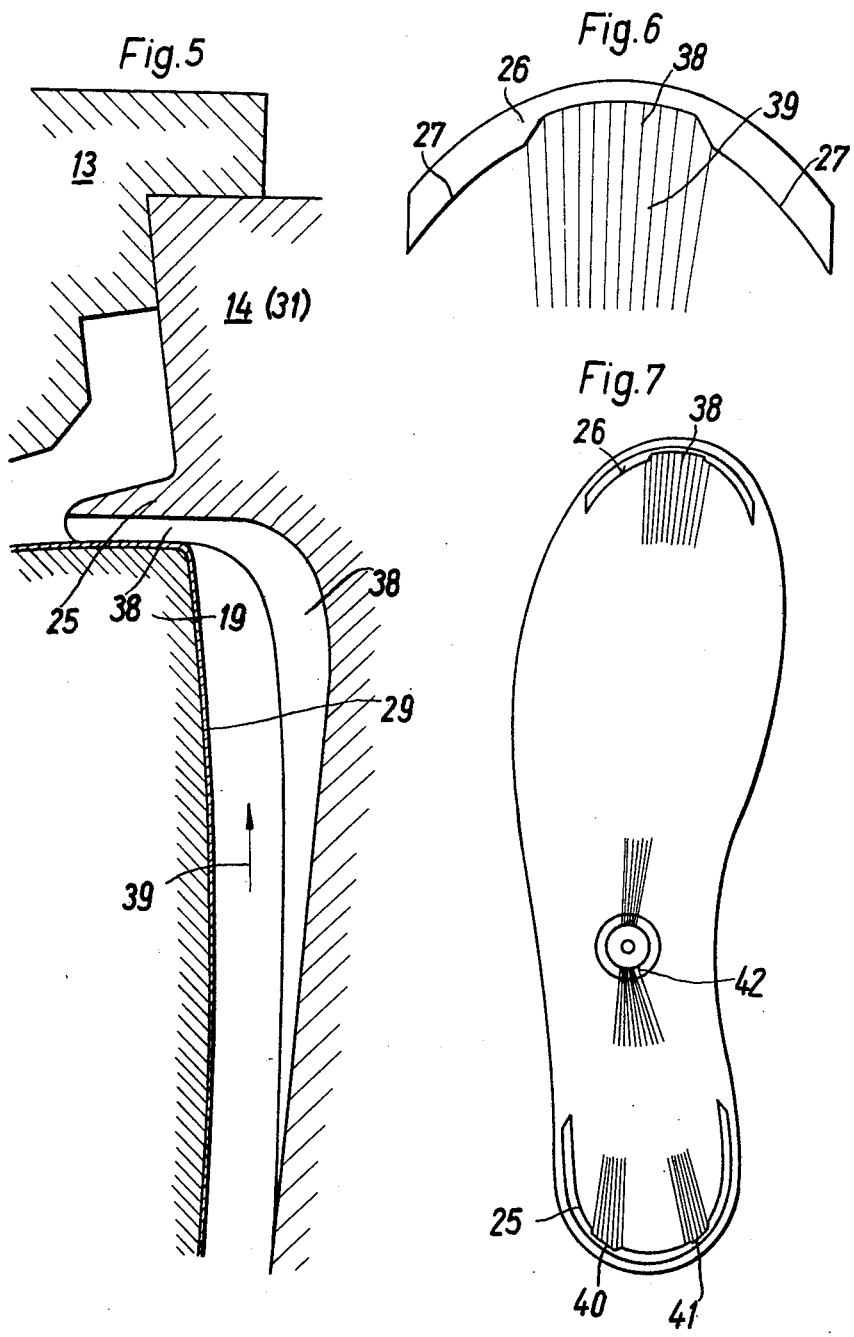

March 17, 1970    K. M. SANTELMANN    3,500,502
MOLD FOR THE PRODUCTION OF BOOTS OF RUBBER OR PLASTICS MATERIAL
Filed Oct. 4, 1967    4 Sheets-Sheet 4
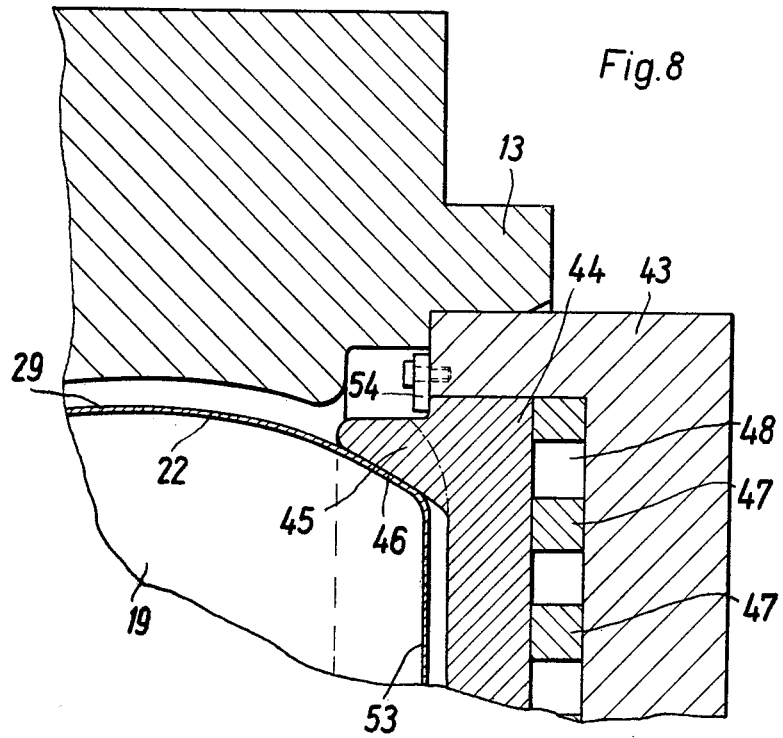
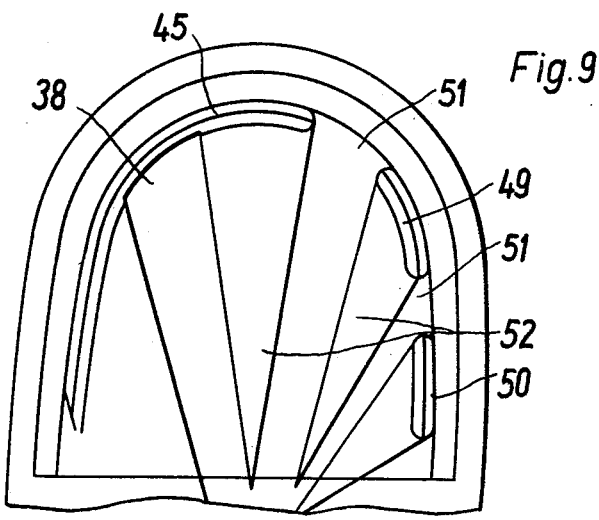
Inventor:
KURT M. SANTELMANN
By
Lowry & Rinehart
ATTYS.

United States Patent Office 3,500,502
Patented Mar. 17, 1970

---

3,500,502
MOLD FOR THE PRODUCTION OF BOOTS OF RUBBER OR PLASTICS MATERIAL
Kurt M. Santelmann, Hamburg, Germany, assignor to Desma-Werke GmbH, Uesen, near Bremen, Germany
Filed Oct. 4, 1967, Ser. No. 672,920
Claims priority, application Germany, Oct. 5, 1966, P 40,503; Feb. 15, 1967, P 41,414; Sept. 15, 1967, P 43,000
Int. Cl. B29f 1/10
U.S. Cl. 18—42                                    25 Claims

ABSTRACT OF THE DISCLOSURE

This disclosure provides a mold for manufacturing boots of moldable material. The mold includes a bottom force means mounted on a split lateral mold to mold a boot sole. A last is mounted within the mold in spaced relationship to the bottom force means and the lateral mold. The bottom force means includes guide fin members mounted thereon to fixedly position the last with respect to transverse movements inside the lateral mold. A biasing means is mounted on the bottom force means to provide longitudinal displacement to the guide fin members with respect to the longitudinal movement of the last.

BACKGROUND OF THE INVENTION

Purpose of the invention

It is the object of this invention to provide a mold which is particularly suitable for the production of high shoes, particularly boots, by injection molding, which overcomes the above-mentioned difficulties.

Summary of the invention

To attain this object, the present invention provides a mold of the above-described type, wherein the last is fixable at its lower end facing the bottom force by guide fins arranged on the bottom force, which fins engage the last on its outer edge and enable longitudinal movement of the last, whilst preventing transverse movements.

Thus, according to the invention, the bottom force is provided with guides, i.e. guide fins, which engage the last, if necessary, at several places of its outside contour and prevent it from moving sideways. However, in order to ensure certain longitudinal displacements of the last in the mold, without damaging the mold, the last, or the textile lining drawn over the last, a certain amount of longitudinal displaceability is ensured in the last.

The displaceability of the last can be obtained either by arranging the guide surfaces of the guide fins parallel to the longitudinal axis of the last, i.e. parallel to its plane of displacement, or by mounting the guide fins displaceable. The invention ensures in any case that the textile lining drawn over the last is not destroyed in the region between the last and the guide fins, even if certain longitudinal motions of the last relative to the mold occur. The indisplaceability of the guide fins transversely to the longitudinal axis of the last eliminates any relative displacement in this direction, in spite of mostly unsymmetrical stresses exerted upon the last during the injection process.

The longitudinal movability of the last relative to the guide fins or together with the guide fins also facilitates positioning and adjusting of the bottom force when closing the mold.

Brief description of drawings

Several embodiments of the invention will now be described by way of example and with reference to the accompanying drawings in which:

FIG. 1 is a longitudinal cross sectional view of a mold according to the invention;
FIG. 2 shows, on an enlarged scale, a detail A of FIG. 1;
FIG. 3 is a fragmentary top plan view of the bottom force of the mold according to FIGS. 1 and 2;
FIG. 4 is a view similar to FIG. 1 of another embodiment of the invention;
FIG. 5 shows a detail similar to that shown in FIG. 2;
FIG. 6 is a top plan view showing a detail of the bottom force;
FIG. 7 is a top plan view of that part of the bottom force which corresponds to the sole;
FIG. 8 shows a detail similar to that shown in FIGS. 2 and 5, and
FIG. 9 is a top plan view of the back side of the bottom force.

Description of specific embodiments

The invention concerns itself with the production of shoes, particularly boots, by injection molding. The problem of the invention is the fixing and centering in the mold of the long last which is usually only supported outside the hollow space of the mold in such a way that uniform wall thicknesses are obtainable in the boot.

According to the injection molding mold in FIG. 1, a mold holder 11 is mounted on a support pivot 10. The support pivot 10 is connected to a projection of the injection molding apparatus, and more particularly to the projection of a turntable of an automatic injection molding machine, through hinge members 12. The mold holder 11 serves for the reception of a lateral mold 13, which, if necessary, may be of the multiple component type, to mold the outside of the boot leg. Moreover, the injection mold possesses a bottom force 14 which is provided with an injection channel 15 for the introduction of molding material into the hollow space of the mold. In the illustrated embodiment, the bottom force 14 serves as the termination of a boot sole 16 which is connected to the boot leg 17. The bottom force 14 is arranged in a bottom force holder 18. The bottom force 14 may, if necessary, be exchanged with a bottom force which receives the entire sole. A suitable last 19 is provided for the limitation of the inside of the boot leg 17 as well as the boot sole 16, which last is split along a plane of division 20. This division of the last 19 facilitates the removal of the last from the finished boot.

The last 19 is secured to the support pivot 10 by means of hinges 21 and 22. A rod 23 serves to displace the last components along the plane of division 20 of the last 19. The last 19 is further supported on the mold holder 11 by links 24.

According to this invention, a means for centering the components of the last 19 facing the bottom force 14 is provided for on the bottom force 14. In the embodiment illustrated in FIGS. 1 to 3, a horse-shoe-shaped guide fin 25 or 26, respectively, serves to center the last 19 at the heel and toe of the boot. The guide fin 25 associated with the heel is shown in cross section in FIG. 2 and in detail in a top plan view in FIG. 3. The guide fins 25 and 26 have guide surfaces 27 facing the inside and extending parallel to the longitudinal axis of the last 19. An opposing surface 28 of the last which rests against the guide surface 27 and the guide fins 25 and 26 is also arranged parallel to the longitudinal axis of the last and thus parallel to the guide surface 27 of the guide fins 25 and 26. In this way, the last 19 may move to a certain extent in its longitudinal direction, but not at all transversely. The advantage of this design resides in that, with positively occurring displacements of the last, for example due to expansion of material as a result of occurring temperatures, due to unexact fit of the mountings, etc., there cannot occur any destruction of the form as a result of the centering of the last and further any destruction of a textile lining 29 (FIG. 5) attached to the last. On the other hand, differences in the wall thickness of the boot, however, are also eliminated by the avoidance of any transverse motion.

A clearance 30 is provided in the area of the guide surface 27 and between its opposing surface 28 and between the guide fins 25 and 26 and the last 19 which permits the reception of the textile lining 29 in this area. Further, the opposing surface 28 on the last 19 is designed wider or higher than the effective guide surfaces 27 of the guide fins 25 and 26, so that free motion of the last is possible to a certain extent in its longitudinal direction.

The outward ends of the horse-shoe-shaped guide fins 25 and 26 extend parallel to each other (FIG. 3). In addition, the ends are constructed to run into points. In order to facilitate the engagement of the last with the guide fins 25 and 26, the upper edges of these guide fins 25 and 26 and the lower edge of the last are advantageously somewhat tapered.

In the use of this invention, the centering of the last is above all significant in the molding of the sole 16. A device according to the invention is shown in FIG. 4, which device works with two bottom forces 31 and 32. The bottom force 31 serves for the production of sole 16 in a first stage, while the bottom force 32 provided with a corresponding recess serves for the subsequent molding on of the sole proper. The two bottom forces 31 and 32 are attached to a pivotably mounted reversible plate 33, so that the two bottom forces 31 and 32 can be lined up alternately with the last 19 by pivoting the reversible plate 33. A form holder cover 34 serves to mount and control the reversible plate 33. Cylinders 35 provided with control mechanisms serve to raise the reversible plate 33 during the pivotal motion. Said cylinders are mounted on the form holder cover 34. The head of an injection molding apparatus 36 projects through the form holder cover 34, which apparatus can alternately inject the boot leg 17 or the sole through a nozzle. Said nozzle is arranged at an angle to the longitudinal axis of the last 19. A drive 37 having a joint is provided to turn the reversible plate 33.

The bottom force 31 which is to mold the sole 16 on is constructed in the manner described in FIGS. 1 to 3. The guide fins 25 and 26 may be made in the particular manner of FIGS. 5 to 7 for a better distribution of the injection molding material. Flow-through depressions 38 are provided for in the guide fins 25 and 26 for the passage therethrough of the viscous injection material. A clearance between the last 19 or the textile lining drawn over the last 19 on the one hand and the guide fins 25 and 26 on the other hand is provided in the area of the flow-through depressions 38, so that the material may be better distributed. The injection material flows through the injection molding mold in the direction of arrow 39 and can pass through the flow-through depressions 38 around the last 19. The flow-through depressions 38 which are also provided in the area of the bottom surface of the bottom force 14 or 31, respectively, first widen in the direction of flow of the material and finally narrow at the outlet end, i.e. at the end of the last 19.

FIG. 6 shows the guide fin 26 on the boot tip in a horizontal plan, which guide fin also has a flow-through depression 38. The direction of flow of the material is indicated by lines 39a.

In the embodiment shown in FIG. 7, the guide fin 27 at the heel end side is provided with two spaced narrow flow-through depressions 40 and 41. Again, the direction of flow of the injection material entering hole 42 is indicated by lines.

Equal distribution of the injection material in the hollow space of the mold through the guide fins 25 and 26 is ensured by the flow-through depressions 38, 40 and 41. In particular, a good distribution of the injection material is obtained even in the heel and toe areas by means of the flow-through depressions 38 as well as 40 and 41. The flow-through depressions also prevent the textile lining drawn over the last from being displaced by the flowing injection material. In addition, the flow-through depressions may be so arranged that no seam of the textile lining 29 gets pinched between the guide fins 25 and 26 on the one hand and the last 19 on the other hand.

A further very important embodiment of the invention is shown in FIGS. 8 and 9. In this embodiment, elastic displaceability of guide fins 45 or 26, respectively, ensures longitudinal displaceability of the last 19. For this purpose, a recess in a bottom force 43 receives a mold plate 44 which may move in the longitudinal direction of the last 19 while permitting no transverse motion. The upper side of the mold plate serves to form the boot sole (not shown). Moreover, guide fins 45 are arranged on the upper side of the mold plate 44 which guide fins may be adapted to the contour of the last 19 because of the movability of the mold plate 44, i.e. said fins may have, for example, a sloping or curved bearing surface 46.

The mold plate 44 is elastically mounted on spring elements 47. Said spring elements, which are made for example of heat resisting elastic material, are preferably prestressed. Prestress is obtained by inserting the mold plate 44 into the recess of the bottom force 43 by compressing the spring elements 47 and fixing it in position by means of a stop 54 which preferably is adjustable. Thus, prestress of the spring elements 47 is maintained by the stop 54.

Preferably, the spring element 47 should consist of disks of an elastic material having holes 48.

The guide fins 45 may be continuous, i.e. substantially horse-shoe-shaped, or they may be individual partial fins. FIG. 9 shows an embodiment having partial fins 45, 49 and 50. Between the individual partial fins 45, 49, 50 gaps 51 arise which carry on as shallow channels towards the nozzle of the injection molding channel 15 (not shown in FIG. 9). Between the gaps 51 having a channel-type conguration there are provided areas 52 which fit the contour of the last bottom 53. These elevated areas 52 prevent any tilting of the mold plate 44 relative to the last 19.

The elastic mounting of the entire mold plate 44 is particularly advantageous, because it ensures optimal fit on the last 19, in particular during the closing of the injection molding mold. On the other hand, the prestress of the spring elements 47 prevents the mold plate 44 from turning arbitrarily and ensures good centering of the last 19.

What is claimed is:
1. A mold for manufacturing boots of moldable material comprising:
   (a) a bottom force means mounted on a split lateral mold to mold a boot sole, and
   (b) a last mounted within said mold in spaced relationship to said bottom force means and said lateral mold,
   (c) said bottom force means include guide fin members mounted thereon to fixedly position said last with respect to transverse movements, and
   (d) said bottom force means include biasing means to provide longitudinal displacement to said guide fin members.
2. A mold as defined in claim 1 wherein:
said bottom force means include a bottom mold plate movably mounted on a bottom force body member, said guide fin members being fixedly mounted on said mold plate,
said biasing means being located between said mold plate and said bottom force body member to provide longitudinal displacement to said mold plate to cause said guide fin members to be resiliently movable with respect to the last,

3. A mold as defined in claim 2 wherein said biasing means includes spring elements.

4. A mold as defined in claim 3 wherein:
said bottom force body member includes a recess in which said bottom mold plate is movably mounted,
said bottom force means include means to limit movement of said mold plate in a direction toward the last when biased by said spring elements.

5. A mold as defined in claim 4 wherein said limiting means simultaneously causes a prestressing of said spring elements.

6. A mold as defined in claim 3 wherein said spring elements comprise prestressed members composed of heat resisting elastic material.

7. A mold as defined in claim 6 wherein:
said bottom force body member includes a recess in which said bottom mold plate is movably mounted,
said bottom force means include means to cause the prestressing of said heat resisting elastic members and limit movement of said mold plate in a direction toward the last when biased by said prestressed members.

8. A mold as defined in claim 7 wherein said prestressed spring elements are disk members having holes extending therethrough.

9. A mold for manufacturing boots of moldable material comprising:
(a) a bottom force means mounted on a split lateral mold to mold a boot sole, and
(b) a last mounted within the mold in spaced relationship to the bottom force means and the laterial mold,
(c) said bottom force means include guide fin members to fixedly position the last with respect to transverse movements,
(d) said guide fin members include a bearing means having a structural configuration to engage the last and allow relative longitudinal displacement of the last with respect to the fin members while engaged during the molding operation.

10. A mold as defined in claim 9 wherein said guide fin members include spaced apart gaps which lead into an injection molding channel located between the bottom of said last and said mold plate.

11. A mold as defined in clam 9 wherein:
said bottom force means includes a bottom mold plate,
the guide fin members being mounted on the bottom mold plate, and
the bearing means include inner guide surfaces which engage the outer edge of the last and extend parallel to the longitudinal axis of the last.

12. A mold as defined in claim 11 wherein:
said bottom force means includes a bottom mold plate,
the guide fin members being mounted on the bottom mold plate and include spaced apart gaps which lead into an injection molding channel located between the bottom of said last and said mold plate,
said gaps form elevated areas corresponding to said bearing surfaces to prevent said last from tilting.

13. A mold as defined in claim 12 wherein said spaced apart gaps project into shallow channels as they lead into said injection molding channel.

14. A mold as defined in claim 11 wherein:
said last includes opposing surfaces located on the lower end thereof to face the inner guide surfaces,
the opposing surfaces extend in a direction parallel to the longitudinal axis of the last.

15. A mold as defined in claim 14 wherein the guide surfaces have a height that is smaller than the height of the opposing surfaces on the last.

16. A mold as defined in claim 14 wherein:
the guide fin members have a horse shoe-shaped configuration,
a guide fin member is mounted at each end of the mold plate, and
the guide surfaces are located on the inside of the guide fin members.

17. A mold as defined in claim 16 wherein the horseshoe-shaped guide fin members run into points at their ends.

18. A mold as defined in claim 16 wherein the guide surfaces at the ends of the horseshoe-shaped guide fin members in the sole extend parallel to each other.

19. A mold as defined in claim 14 wherein the guide surfaces and the opposing surfaces are in spaced relationship to receive a textile lining suitably compressed in this area therebetween.

20. A mold as defined in claim 14 wherein the opposing surfaces on the last have a shaped configuration that follows the pattern of an inner sole at the edge of the last bottom.

21. A mold as defined in claim 11 wherein both the lower edge of the last in the area of the guide fin members and the upper inner edge of the guide fin members are tapered to allow relative movement between the last and the guide fin members.

22. A mold as defined in claim 11 wherein the guide fin members include flow-through depressions on the side facing the last to allow injection molding material to flow therethrough.

23. A mold as defined in claim 22 wherein there is a plurality of flow-through depressions which are symmetrically disposed to the longitudinal center plane of the last bottom.

24. A mold as defined in claim 22 wherein the flow-through depressions project into the bottom surface of the bottom force and first widen and then narrow in the direction of the flow of the injectnion molding material.

25. A mold as defined in claim 22 wherein the flow-through depressions widen in the direction of flow of the injection molding material.

References Cited

UNITED STATES PATENTS

| | | | |
|---|---|---|---|
| 791,649 | 6/1905 | Richards | 18—36 X |
| 2,830,324 | 4/1958 | Farmer et al. | 18—46 X |
| 2,985,919 | 5/1961 | Borroff et al. | 18—42 X |
| 3,128,505 | 4/1964 | Ludwig | 18—42 |
| 3,287,767 | 11/1966 | Ford et al. | 18—42 X |
| 3,302,243 | 2/1967 | Ludwig | 18—30 |
| 3,366,995 | 2/1968 | Dijken et al. | 18—36 |

FOREIGN PATENTS

| | | |
|---|---|---|
| 979,571 | 12/1950 | France. |
| 881,641 | 11/1961 | Great Britain. |
| 272,620 | 8/1964 | Netherlands. |

J. HOWARD FLINT, JR., Primary Examiner

U.S. Cl. X.R.

18—30